US010389519B2

(12) United States Patent
Cheng et al.

(10) Patent No.: US 10,389,519 B2
(45) Date of Patent: Aug. 20, 2019

(54) HARDWARE BASED CRYPTOGRAPHIC SIDE-CHANNEL ATTACK PREVENTION (71) Applicant: International Business Machines Corporation, Armonk, NY (US)

(72) Inventors: Kangguo Cheng, Schenectady, NY (US); Shawn P. Fetterolf, Cornwall, VT (US); Ali Khakifirooz, Los Altos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 222 days.

(21) Appl. No.: 15/282,072

(22) Filed: Sep. 30, 2016

(65) Prior Publication Data
US 2018/0097612 A1 Apr. 5, 2018

(51) Int. Cl.
*H04L 9/00* (2006.01)

(52) U.S. Cl.
CPC .......... *H04L 9/003* (2013.01); *H04L 2209/08* (2013.01)

(58) Field of Classification Search
CPC ........................ H04L 9/003; H04L 2209/08
See application file for complete search history.

(56) References Cited

U.S. PATENT DOCUMENTS

| 5,293,457 A * | 3/1994 | Arima | G06N 3/063 706/34 |
| 7,519,643 B2 | 4/2009 | Har et al. | |
| 8,269,261 B2 * | 9/2012 | Rothberg | C12Q 1/6874 257/253 |
| 9,240,786 B2 | 1/2016 | Tanimura et al. | |
| 9,641,141 B1 * | 5/2017 | Zheng | H03F 3/2171 |
| 2004/0189388 A1 * | 9/2004 | Nguyen | H03F 1/3211 330/254 |
| 2006/0069710 A1 * | 3/2006 | Har | G06F 7/728 708/491 |
| 2007/0076890 A1 * | 4/2007 | Muresan | H04L 9/003 380/287 |

(Continued)

FOREIGN PATENT DOCUMENTS

JP          5544611 B2      7/2010

OTHER PUBLICATIONS

Hasan, "Power Analysis Attacks and Algorithmic Approaches to their Countermeasures for Koblitz Curve Cryptosystems," in Cryptographic Hardware and Embedded Systems—CHES 2000 Second International Workshop Worcester, MA, USA, Aug. 17-18, 2000 Proceedings Cetin K. Koç Christof Paar (Eds.) (Related).

(Continued)

*Primary Examiner* — Joseph P Hirl
*Assistant Examiner* — J. Brant Murphy
(74) *Attorney, Agent, or Firm* — Vazken Alexanian; McGinn IP Law Group, PLLC (57) ABSTRACT A method of controlling transistors includes receiving a control signal, and controlling the top and bottom gate biases of the transistors according to the control signal to normalize or randomize power drawn as observed outside of a core. A device for controlling transistors includes a core performing computational instructions, and a bias circuit receiving a control signal, the bias circuit controlling the top and bottom gate biases of the transistors according to the control signal to normalize or randomize power drawn as observed outside of the core.

20 Claims, 12 Drawing Sheets

(56) References Cited

U.S. PATENT DOCUMENTS

| | | | | |
|---|---|---|---|---|
| 2008/0063208 | A1* | 3/2008 | Ikushima | H04K 1/02 380/278 |
| 2008/0224727 | A1* | 9/2008 | Verbauwhede | G06F 7/00 326/8 |
| 2009/0112896 | A1* | 4/2009 | Golic | G06F 7/764 |
| 2009/0190413 | A1* | 7/2009 | Hsu | G11C 11/412 365/189.09 |
| 2011/0085662 | A1* | 4/2011 | Myers | H03K 19/17704 380/252 |
| 2011/0285420 | A1* | 11/2011 | Deas | H04L 9/003 326/8 |
| 2011/0304394 | A1* | 12/2011 | Bult | H03F 3/195 330/253 |
| 2012/0040844 | A1* | 2/2012 | Rothberg | C12Q 1/6874 506/7 |
| 2012/0045061 | A1* | 2/2012 | Danger | H04L 9/003 380/277 |
| 2012/0294066 | A1* | 11/2012 | Yoneda | G11C 19/184 365/149 |
| 2013/0129083 | A1* | 5/2013 | Fujino | G11C 7/24 380/29 |
| 2013/0293259 | A1* | 11/2013 | Tanimura | H03K 19/00392 326/8 |
| 2015/0270722 | A1* | 9/2015 | Tsai | G06F 1/26 307/104 |
| 2016/0140340 | A1* | 5/2016 | Walters | G06F 21/556 726/22 |

OTHER PUBLICATIONS

Kato et al., "A Design for Modular Exponentiation Coprocessor in Mobile Telecommunication Terminals", in Cryptographic Hardware and Embedded Systems—CHES 2000 Second International Workshop Worcester, MA, USA, Aug. 17-18, 2000 Proceedings Cetin K. Koç Christof Paar (Eds.) (Related).

Coron et al., "On Boolean and Arithmetic Masking against Differential Power Analysis", in Cryptographic Hardware and Embedded Systems—CHES 2000 Second International Workshop Worcester, MA, USA, Aug. 17-18, 2000 Proceedings Cetin K. Koç Christof Paar (Eds.) (Related).

Chari et al. "Towards sound approaches to counteract power-analysis attacks." Advances in Cryptology—CRYPTO'99. Springer Berlin Heidelberg, 1999. (Background).

Clavier et al., "Differential power analysis in the presence of hardware countermeasures." Cryptographic Hardware and Embedded Systems—CHES 2000. Springer Berlin Heidelberg, 2000. (Background).

Hwang et al., "AES-Based Security Coprocessor IC in 0.18-$_T$ m CMOS With Resistance to Differential Power Analysis Side-Channel Attacks", IEEE Journal of Solid-State Circuits, vol. 41, No. 4, Apr. 2006 (Related).

Mel, et al. "The NIST Definition of Cloud Computing". Recommendations of the National Institute of Standards and Technology. Nov. 16, 2015.

* cited by examiner

HARDWARE BASED CRYPTOGRAPHIC SIDE-CHANNEL ATTACK PREVENTION

BACKGROUND OF THE INVENTION

Field of the Invention

The present invention relates generally to a method and apparatus for cryptographic attack prevention, and more particularly relates to a method, system, and apparatus for hardware based cryptographic side-channel attack prevention.

Description of the Related Art

Cryptography can suffer from a simple flaw in thinking and implementation. While algorithms can be developed which obfuscate data through reversible pseudo-random methods (key based encryption being one method) these systems protect data based upon the effort required to decrypt the encrypted information, the more effort required the better the security.

There is a question of whether there is a different attack methodology that can be used effectively and requiring less effort. Side-channel attacks exploit the physical nature of a given cryptographic implementation to defeat the system and obtain keys. These can take the form of electromagnetic monitoring, power fluctuations, and timing implications. By monitoring the physical implementation for changes, keys can be derived and thus the effort required to obtain secret keys is greatly simplified and sped up.

Therefore, there is a need to prevent cryptographic side-channel attack that can be used effectively and requiring less effort.

SUMMARY OF INVENTION

In view of the foregoing and other problems, disadvantages, and drawbacks of the aforementioned background art, an exemplary aspect of the present invention provides a method, system, and apparatus for hardware based cryptographic side-channel attack prevention.

One aspect of the present invention provides a method of controlling transistors, including receiving a control signal, and controlling the back-gate using back-biasing of the transistors according to the control signal to normalize or randomize power drawn as observed outside of a core.

In another aspect of present invention, there is described a device for controlling transistors, including a core performing computational instructions, and a bias circuit receiving a control signal, the bias circuit controlling back-bias of the transistors according to the control signal to normalize or randomize power drawn as observed outside of the core.

In yet another aspect of present invention, there is described a computer program product for controlling transistors, the computer program product including a computer readable storage medium having program instructions embodied therewith, the program instructions readable and executable by a computer to cause the computer to: receive a control signal, and control back-bias of the transistors according to the control signal to normalize or randomize power drawn as observed outside of a core.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

One approach of cryptanalysis is called Mathematical Cryptanalysis. The effort required is derived from the number of bits being used in a key based system as well as the convolution algorithm using those keys to decrypt and encrypt the original cipher text/plaintext pair. However, this level of effort assumes that the attacker in any given situation limited to challenging a perfectly implemented cipher system using known data (0x0 or 0x1 data for instance) and trying to reverse engineer the keys using a known algorithm. Mathematical cryptanalysis ignores any flaws or leaks derived from implementation in an imperfect technology.

Therefore, there is a question of whether is a different attack methodology can be used effectively and requiring less effort. As mentioned, side-channel attacks exploit the physical nature of a given cryptographic implementation to defeat the system and obtain keys.

Figure 1:
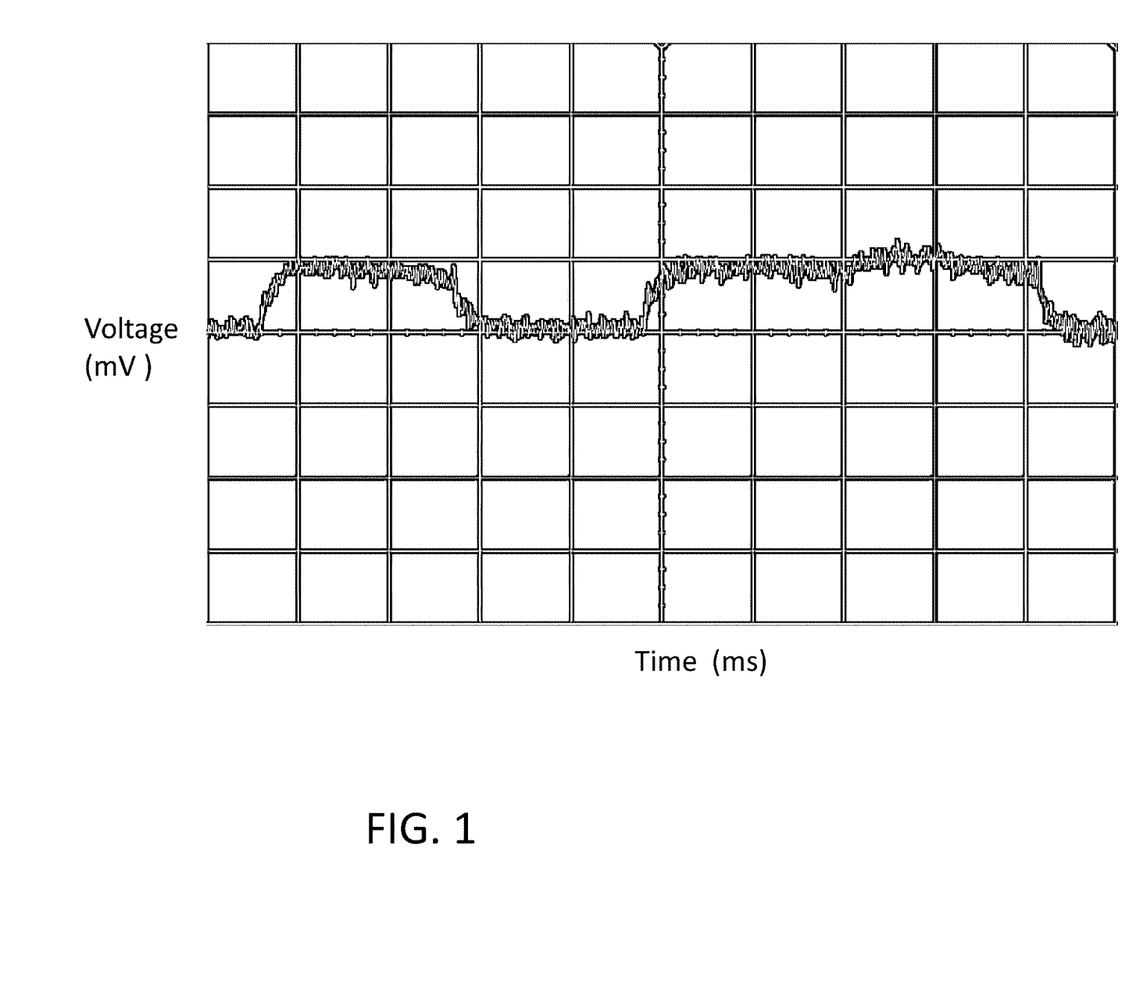
FIG. 1 illustrates a power analysis display.

Power analysis is a type of side channel attack in cryptography in which the attacker measures the power consumption of the cryptography hardware. In differential power analysis (DPA) the attacker can obtain secret keys by statistically analyzing the power consumption over multiple cryptography operations. This is possible because different operations (such as multiplication) result in different power consumption. FIG. 1 illustrates a power analysis display that can be used to provide a side channel attack in cryptography.

The present invention proposes a solution which exploits dynamic sub-circuit $V_{DD}$ (supply voltage, voltage drain-drain) and $V_t$ (threshold voltage) control to either normalize voltage consumption or to make it seem more random to an outside observer at the transistor level. The present invention describes a novel circuit which exploits the nature of FDSOI (Fully Depleted Silicon On Insulator, FD-SOI) technology to use the back gate's back-bias voltage control to further protect cryptographic circuits from voltage monitoring side-channel attacks. The present invention uses a unique characteristics of FDSOI technology to balance power drawn as observed outside of the core performing the operation, where normalizing voltage draw stops cryptographic leakage.

The different examples shown provide techniques of using back-bias for individual transistors to normalize power drawn as observed outside of the core and block based core structure as an example.

Figure 2:
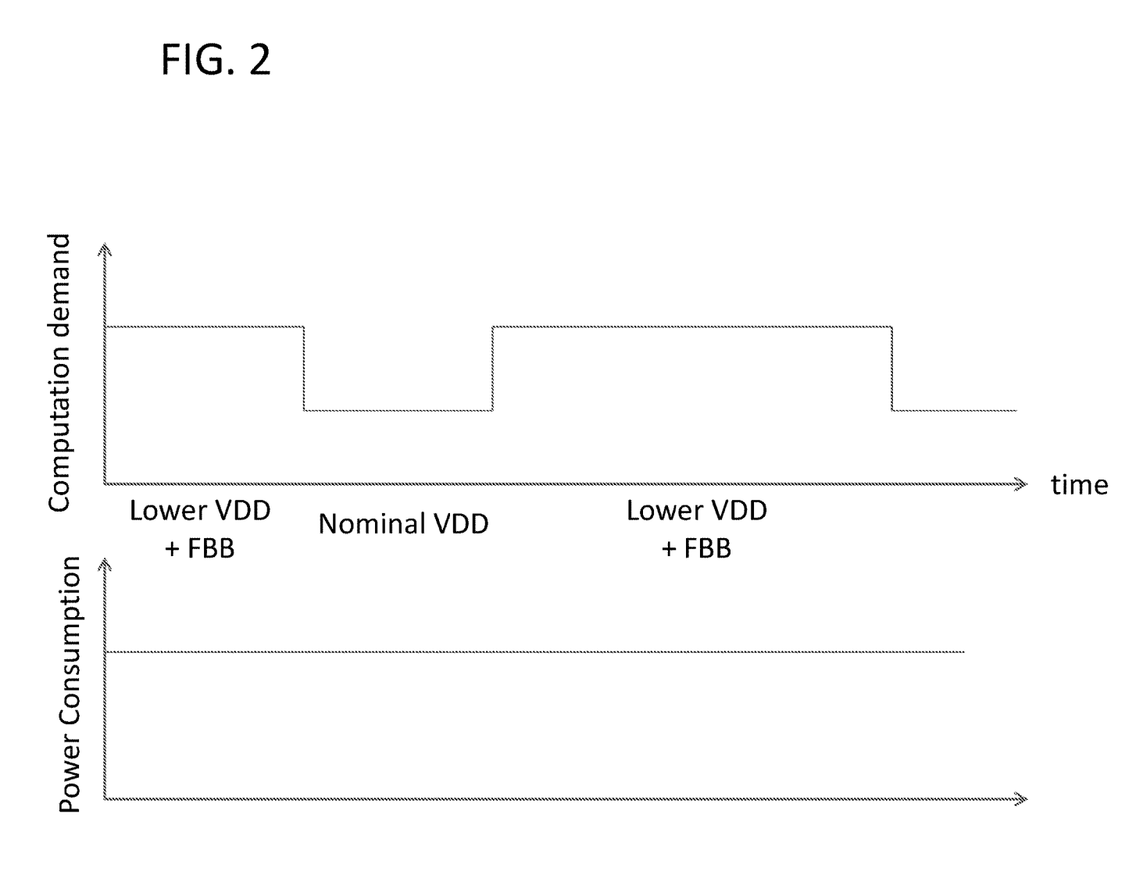
FIG. 2 illustrates computation demand and power consumption.

FIG. 2 illustrates computation demand and power consumption. In FDSOI technology there is a channel on top of an insulating layer that is relatively thin and then on the back side of the insulating layer what is like a phantom gate or second gate called a back gate with its own bias control (called back-bias), so you can change the $V_t$ that activates the channel either applying a field on the top or the bottom or both. Therefore, the proportion between the two can be controlled in real-time. Therefore, at the transistor level a system can make the $V_{DD}$ look any way one wants by switching between these two features.

There is also a circuit that tries to randomize the $V_{DD}$ as it appears externally by swapping and toggling of how much $V_{DD}$ is applied on the top of the gate or how much is applied on the backside gate. Therefore, from the outside it merely looks like random bumps and changes in the $V_{DD}$, although from the transistor function level, it does not change the function and the transistor still performs in a normal manner providing the same performance and function. In this manner, it thwarts an attacker from snooping into the $V_{DD}$ that goes into device to extract information.

Referring to FIG. 2, the present invention proposes a circuit implementation in FDSOI technology in which top gate and bottom gate biases are dynamically adjusted in order to decouple power consumption from computation demand, thereby inhibiting $V_{DD}$ from leaking cryptographic information. The graph depicts how to show the power consumption is constant by intentionally altering the balance between the top gate and bottom gate biases. The graph showing the computation demand would provide a similar graph in power consumption if back bias was not used. However, here since top and bottom gate biases are used the power consumption does not show any detectable change to the outside with the flat power consumption at the transistor level.

Figure 3:
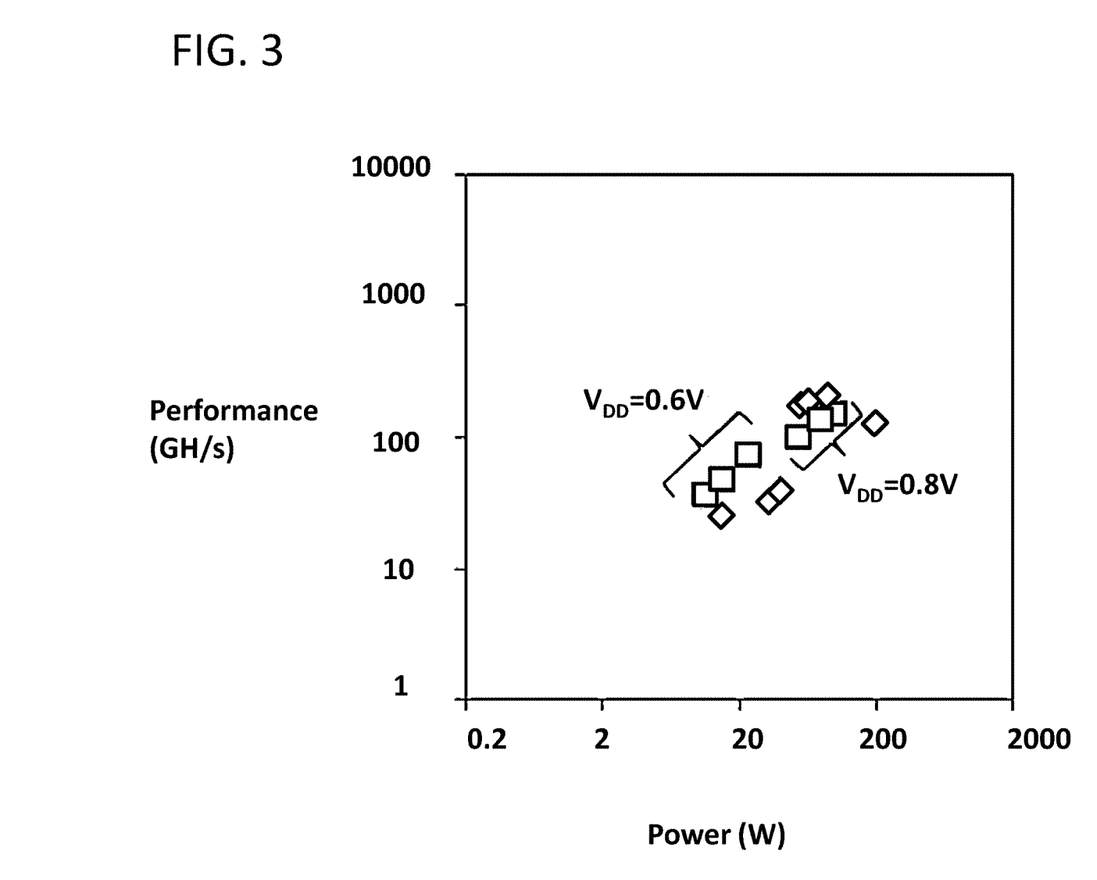
FIG. 3 illustrates a graph of performance versus power in a first exemplary embodiment.

FIG. 3 illustrates a graph of performance versus power and it's relation to $V_{DD}$. The principle of operation is that in a CMOS (Complementary metal-oxide-semiconductor) circuit:

$$\text{power consumption} \sim V_{DD}^2$$

$$\text{performance} \sim (V_{DD} - V_t).$$

By dynamically adjusting both $V_{DD}$ and $V_t$, it is possible to deliver the same performance but at different power consumptions. The graph shows that by changing the $V_{DD}$ by using the top and bottom gate biases, the performance is not compromised. Therefore, there is no difference as to how one balances between the top gate and the bottom gate bias as to how the transistor functions. Therefore, it shows that performance is not compromised to show constant power.

Figure 4:
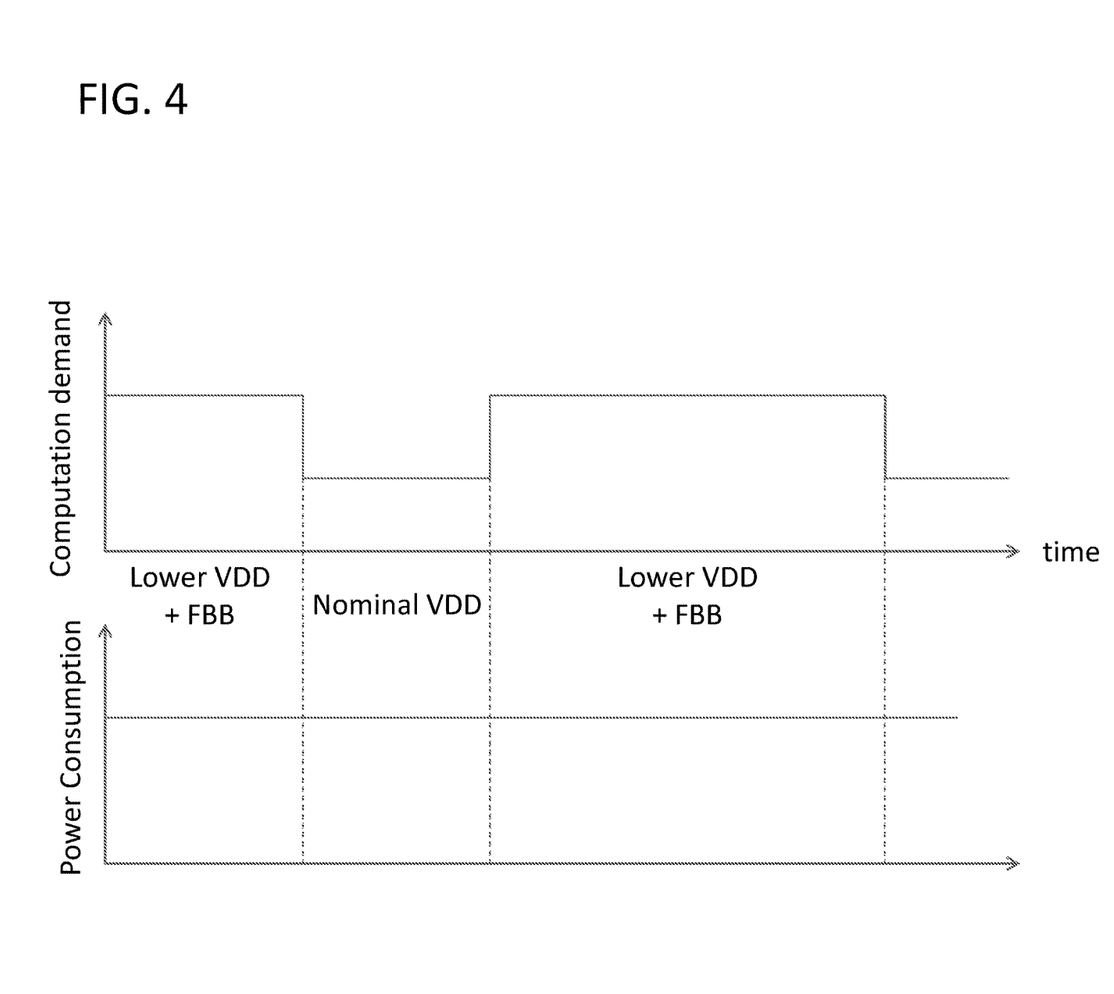
FIG. 4 illustrates computation demand and power consumption in the first exemplary embodiment.

FIG. 4 illustrates computation demand and power consumption in a first exemplary embodiment. The system changes $V_{DD}$ and $V_t$ (through forward body bias, FBB) based on the computation demand. The power consumption looks constant by tweaking between the $V_{DD}$, which is a combination of the top and bottom gate biases. The constant power consumption can be seen in the graph while computational demand is actually variable.

Figure 5:
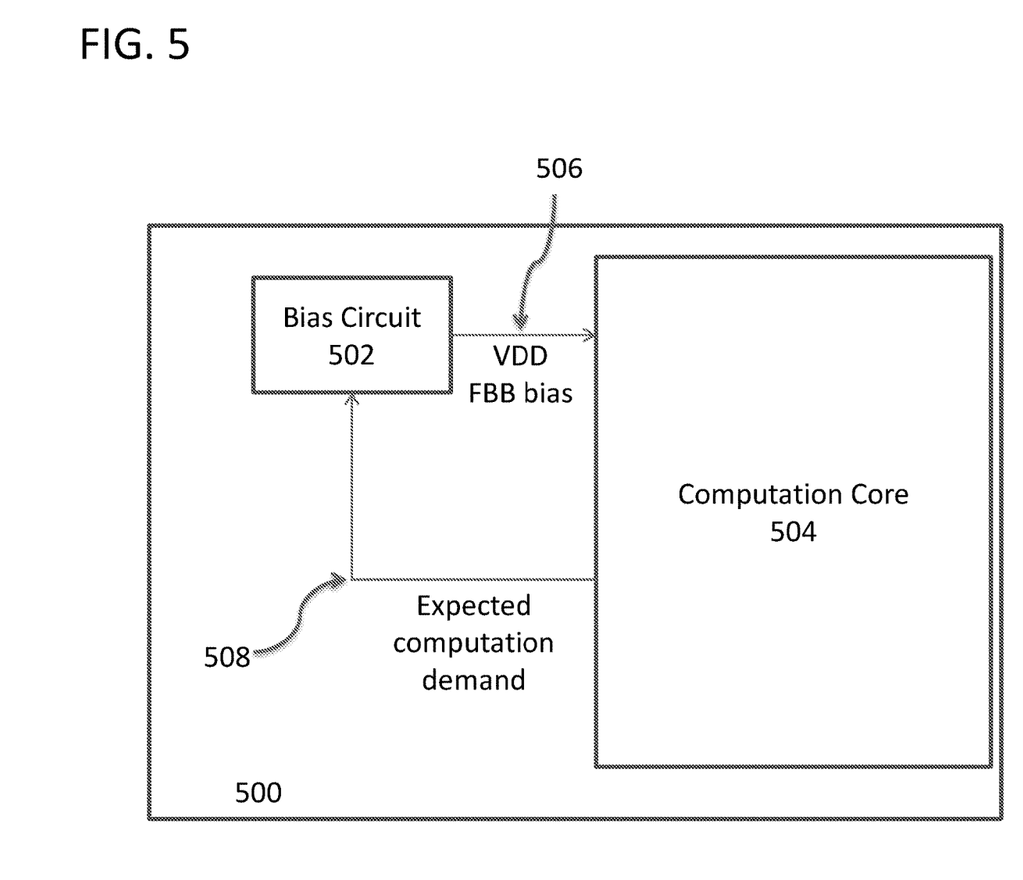
FIG. 5 illustrates a diagram of a system in the first exemplary embodiment.

FIG. 5 illustrates a diagram of a system in the first exemplary embodiment. The circuit for cryptographic side-channel attack prevention 500 includes a computational core 504, which can be a computer, computational circuit, processor, other similar device. The computational core 504 can send a fetch ahead signal to the bias circuit 502 telling the bias circuit that going to operate on a "1" or a "0". Therefore, the expected computational demand 508 is sent to the bias circuit 502 from the computational core 504. Then, the bias circuit 502 will tune the $V_{DD}$, the top and bottom gate biases according to the computational demand signal 508 and send a signal 506 sent to the computational core 504 to $V_{DD}$ and FBB bias. Therefore, when it is known that the computational core 504 is going to operate on a "1" or "0", the bias circuit 502 can add, for example, more back bias to make the power consumption look flat. A cryptographical circuit can be a sub-circuit of the computational core 504.

Therefore, the bias circuit 502 can normalize power consumption such that from an 'outside the circuit perspective' the cryptographic circuit's power consumption appears constant. This circuit 500 adds a bias circuit 502, which based upon the expected computation, tunes $V_{DD}$ and $V_t$ dynamically to maintain transistor performance, while making the $V_{DD}$ input to the circuit appear to be consistently nominal.

Figure 6:
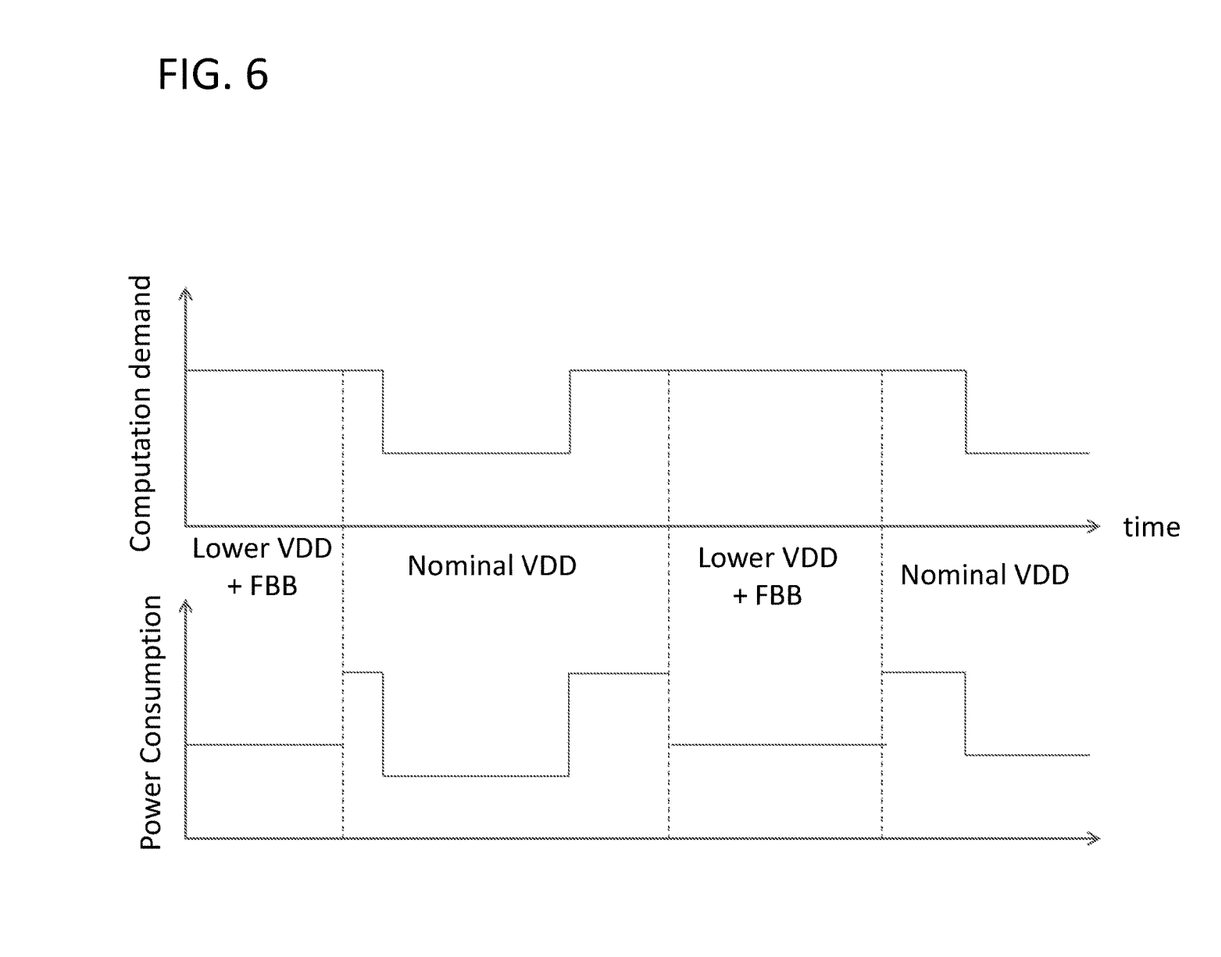
FIG. 6 illustrates computation demand and power consumption in a second exemplary embodiment.

FIG. 6 illustrates computation demand and power consumption in a second exemplary embodiment. In this embodiment, there is a predictive circuit that looks to see as $V_{DD}$ goes up as operating in a certain way depending on if you operating on a "1" or not where changing the transistor on or off, one can apply an certain amount of bottom gate bias to compensate for the top gate bias in order to make $V_{DD}$ look randomly variable all the time.

Figure 7:
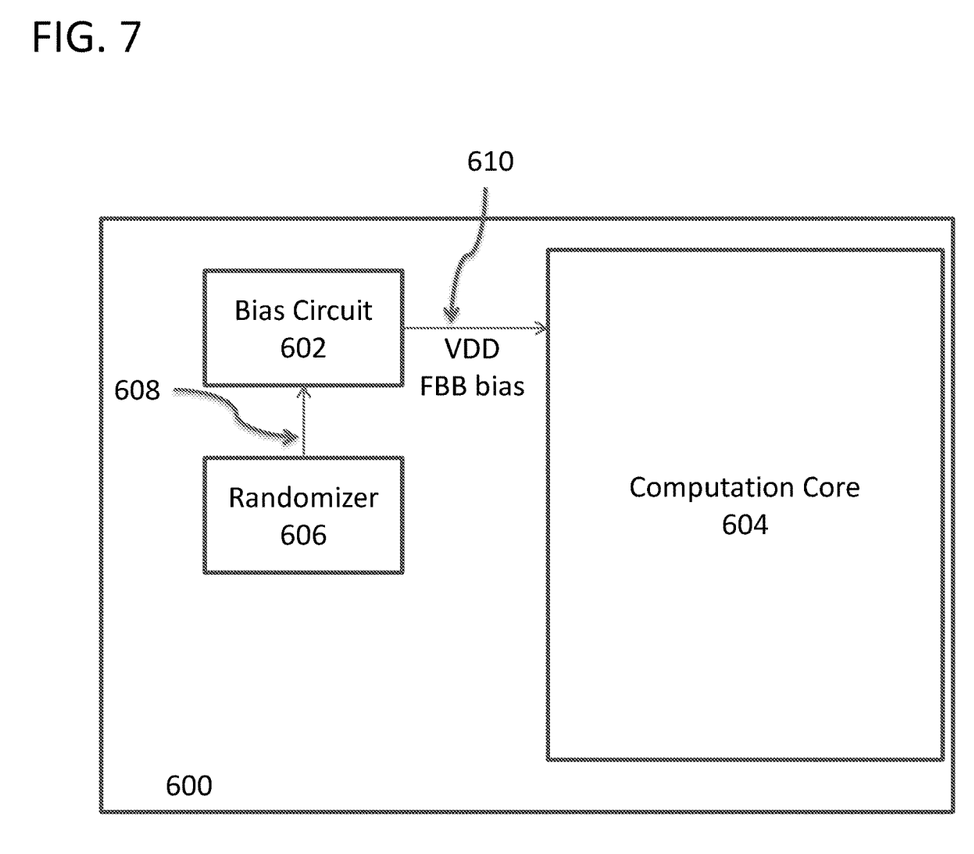
FIG. 7 illustrates a diagram of a system in the second exemplary embodiment.

The circuit for cryptographic side-channel attack prevention 600 of FIG. 7 changes $V_{DD}$ and $V_t$ (through gate bias control) randomly instead of based on the computation demand as seen in the circuit 500 of FIG. 5. The power consumption looks random by tweaking between the $V_{DD}$, which is a combination of top gate bias and the back gate bias. The power consumption can be seen in the graph as being random while computational demand is not related to the actual power consumption. In a side channel attack, the attacker is looking to extract which operations are operating on "1"s and which are operating on "0"s based on power consumption. However, if the power consumption is seen by the attacker as being random, the attacker is unable to extract the information of the operation.

FIG. 7 illustrates a diagram of a system in the second exemplary embodiment. The circuit 600 includes a computational core 604, which can be a computer or other similar device or some computational circuit. A randomizer 606 generates a random signal 608 and sends the random signal 608 to the bias circuit 602. Then, the bias circuit 602 will tune the $V_{DD}$, the top and bottom gate biases, based on the random signal 608. Therefore, unlike the embodiment in FIG. 5, the bias circuit 602 is not dependent on the computational core 604. The bias circuit 602 sends the signal 610 to provide the $V_{DD}$ and gate biases to the computational core 604, such that the power consumption at the transistor level is randomly variable.

Thus the circuit 600 seeks to inject randomization to the power consumption through voltage modulation, once again using the combination of the top and bottom gate's threshold voltage control. This circuit 600 adds a bias circuit 602, which instead of modulating $V_{DD}$ and $V_t$ based upon expected computation, uses a randomization engine to modulate the $V_{DD}$ and $V_t$ to the sub-circuit in order to make the $V_{DD}$ input to the circuit appear to be random at any given time while maintaining overall circuit performance.

Thus, it shows a novel circuit which exploits the fundamental nature of the FDSOI technology in using both the top and bottom gate bias voltage controls to further protect cryptographic circuits from voltage monitoring side-channel attacks.

Parts of one or more embodiments may be a device, a system, a method and/or a computer program product to control the bias. The computer program product in accordance with one or more embodiments includes a computer readable storage medium (or media) having program instructions thereon for causing a processor to carry out aspects of one or more embodiments.

Figure 8:
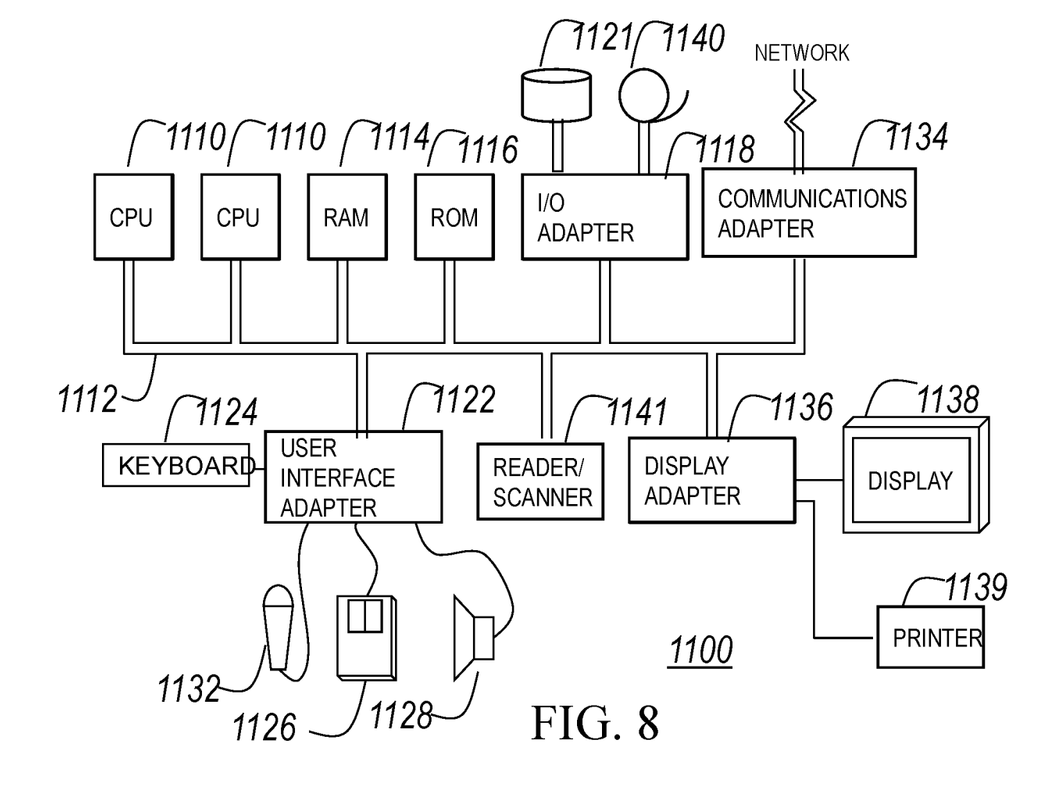
FIG. 8 illustrates an exemplary hardware/information handling system for incorporating the exemplary embodiment of the invention therein.

FIG. 8 illustrates another hardware configuration of an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 9), directly or indirectly accessible by the CPU 1210.

Figure 9:
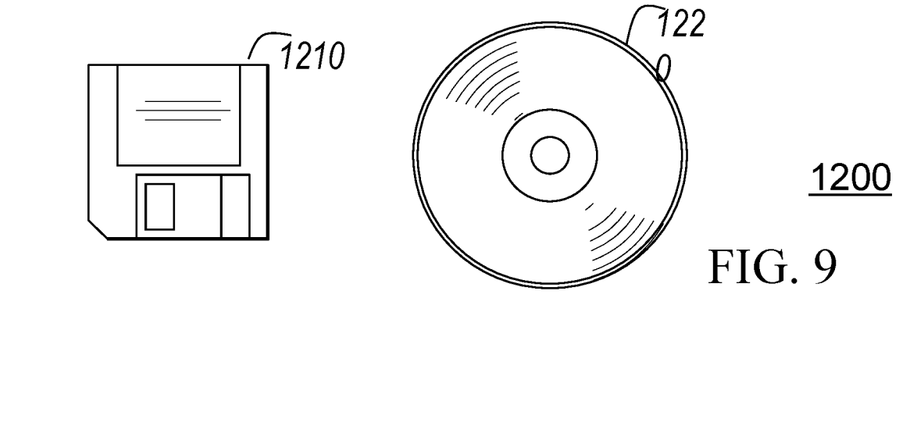
FIG. 9 illustrates a signal-bearing storage medium for storing machine-readable instructions of a program that implements the method according to the exemplary embodiment of the invention.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
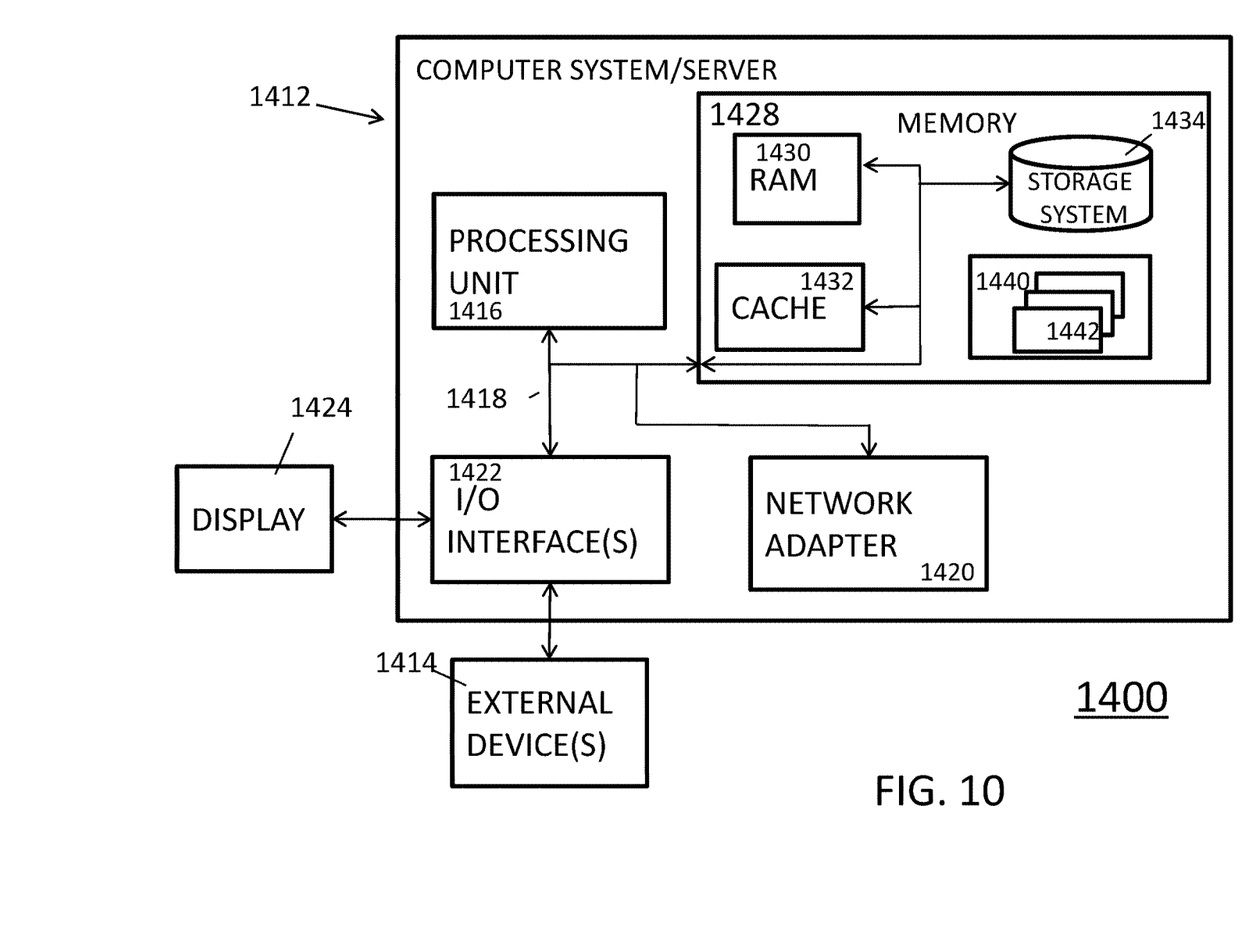
FIG. 10 depicts a cloud computing node according to an embodiment of the present invention.

Referring now to FIG. 10, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432.

Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 11:
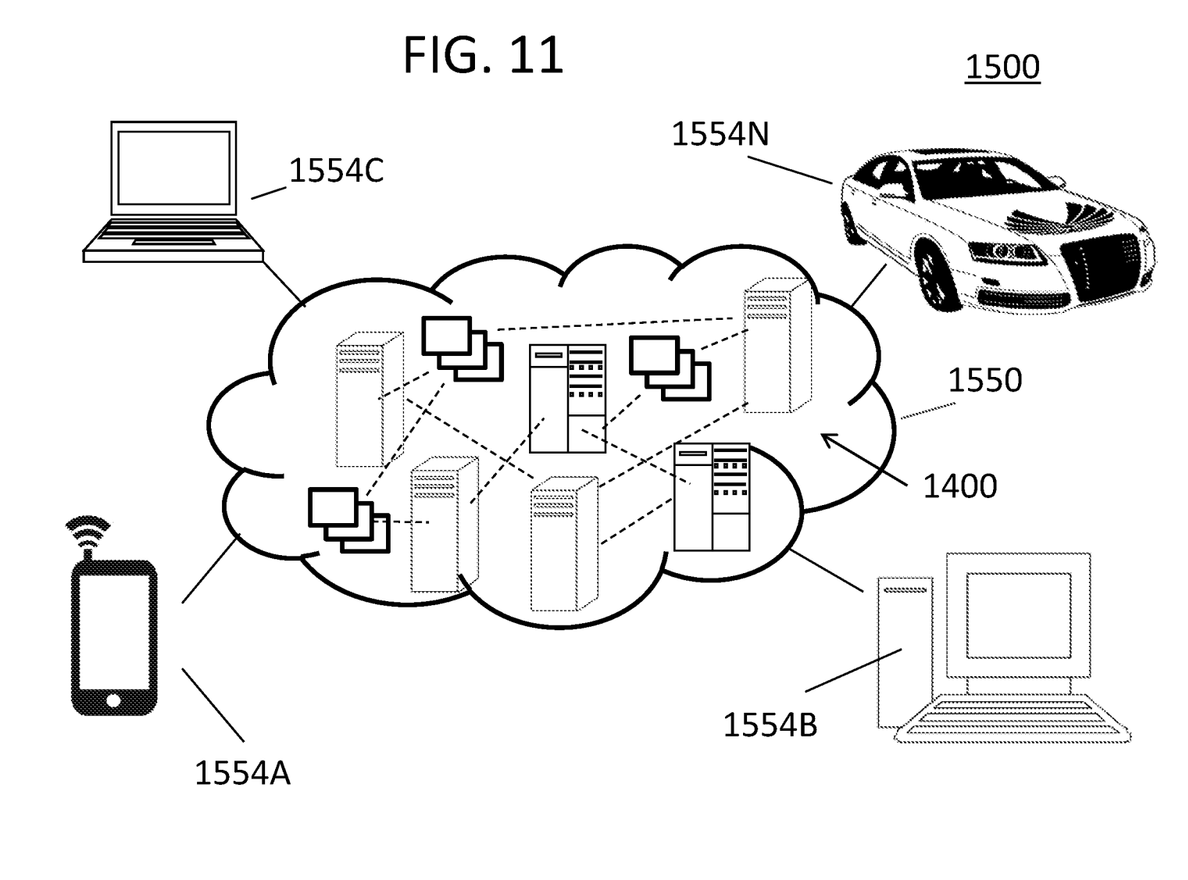
FIG. 11 depicts a cloud computing environment according to an embodiment of the present invention.

Referring now to FIG. 11, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 11 are intended to be illustrative only and that computing nodes 1400 and cloud computing environment 1550 can communicate with any type of computerized device over any type of network and/or network addressable connection (e.g., using a web browser).

Figure 12:
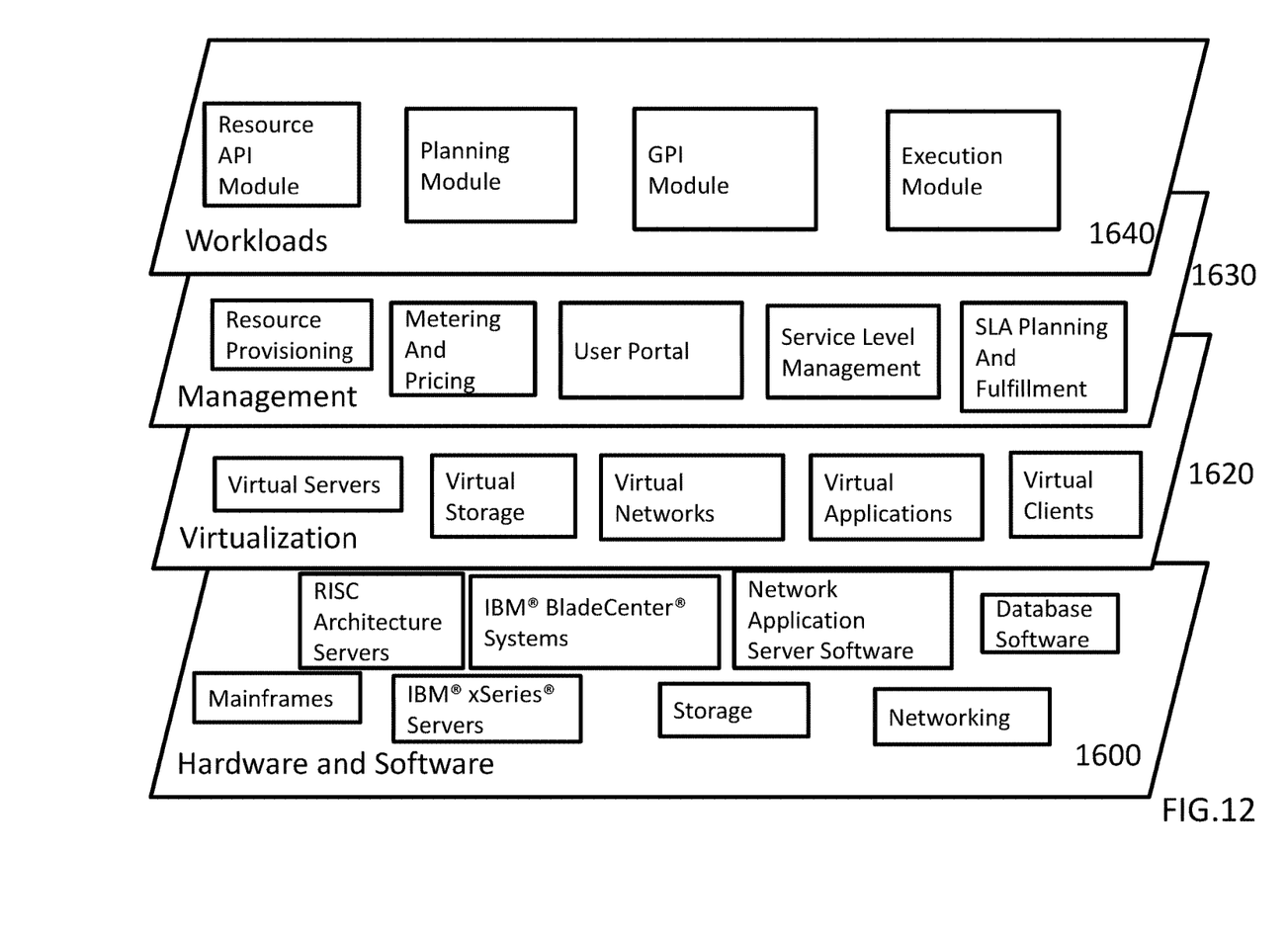
FIG. 12 depicts abstraction model layers according to an embodiment of the present invention.

Referring now to FIG. 12, a set of functional abstraction layers provided by cloud computing environment 1550 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of controlling transistors, comprising:
   receiving a control signal; and
   controlling top and bottom gate biases of the transistors according to the control signal, the top and bottom gate biases being configured to normalize or randomize power drawn as observed outside of a core.

2. The method according to claim 1, wherein the controlling of the top and bottom gate biases of the transistors is to normalize as observed outside of the core.

3. The method according to claim 1, wherein the controlling of the top and bottom gate biases to the transistors is to randomize power drawn as observed outside of the core.

4. The method according to claim 1, wherein the controlling of the top and bottom gate biases is to obfuscate detection of computation information from the core.

5. The method according to claim 1, wherein the controlling of the top and bottom gate biases is for each of the transistors to normalize or randomize power drawn as observed outside of the core.

6. The method according to claim 1, wherein the control signal for normalizing the power drawn, modulates the top and bottom gate biases according to a computation signal received from the core.

7. The method according to claim 1, wherein the control signal for randomizing the power drawn, modulates the top and bottom gate biases according to a random signal.

8. A device for controlling transistors, comprising:
   a core performing computational instructions; and
   a bias circuit receiving a control signal, the bias circuit controlling top and bottom gate biases of the transistors according to the control signal, the top and bottom gate biases being configured to normalize or randomize power drawn as observed outside of the core.

9. The device according to claim 8, wherein the bias circuit controls the top and bottom gate biases of the transistors to normalize as observed outside of the core.

10. The device according to claim 8, wherein the bias circuit controls the top and bottom gate biases to the transistors to randomize power drawn as observed outside of the core.

11. The device according to claim 8, wherein the bias circuit controls the top and bottom gate biases to obfuscate detection of computation information from the core.

12. The device according to claim 8, wherein the bias circuit controls the top and bottom gate biases for each of the transistors to normalize or randomize power drawn as observed outside of a core.

13. The device according to claim 8, wherein the bias circuit modulates the top and bottom gate biases according to the control signal comprising a computation signal received from the core.

14. The device according to claim 8, further comprising a random signal circuit generating the control signal as a random signal, wherein the bias circuit modulates the top and bottom gate biases according to the random signal.

15. A non-transitory computer program product for controlling transistors, the computer program product comprising a computer readable storage medium having program instructions embodied therewith, the program instructions readable and executable by a computer to cause the computer to:
   receive a control signal; and
   control top and bottom gate biases of the transistors according to the control signal, the top and bottom gate biases being configured to normalize or randomize power drawn as observed outside of a core.

16. The non-transitory computer program product according to claim 15, wherein the controlling of the top and bottom gate biases of the transistors is to normalize as observed outside of the core.

17. The non-transitory computer program product according to claim 15, wherein the controlling of the top and bottom gate biases to the transistors is to randomize power drawn as observed outside of the core.

18. The non-transitory computer program product according to claim 15, wherein the controlling of the top and bottom gate biases is to obfuscate detection of computation information from the core, and wherein the controlling of the top and bottom gate biases is for controlling the top and bottom gate biases for each of the transistors to normalize or randomize power drawn as observed outside of the core.

19. The non-transitory computer program product according to claim 15, wherein the control signal for normalizing the power drawn, modulates the top and bottom gate biases according to a computation signal received from the core.

20. The non-transitory computer program product according to claim 15, wherein the control signal for randomizing the power drawn, modulates the top and bottom gate biases according to a random signal.

* * * * *